Figure 1:
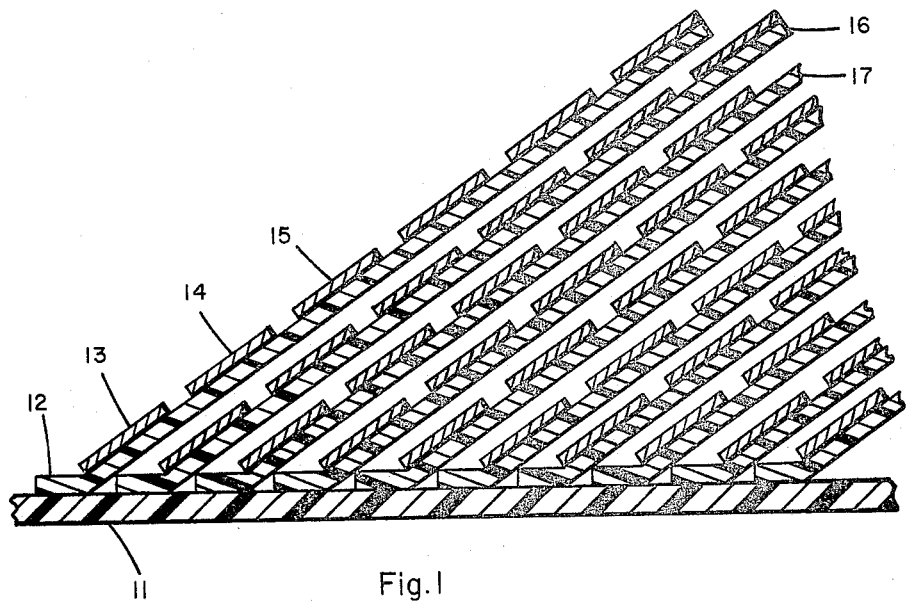

Nov. 15, 1966 R. T. PARMLEY 3,285,460

SPACE VEHICLE INSULATION

Filed Dec. 12, 1962

INVENTOR.
RICHARD T. PARMLEY
BY
ATTORNEY

AGENT 3,285,460
SPACE VEHICLE INSULATION
Richard T. Parmley, San Jose, Calif., assignor to General Dynamics Corporation, San Diego, Calif., a corporation of Delaware
Filed Dec. 12, 1962, Ser. No. 244,186
6 Claims. (Cl. 220—9)

This invention relates to an insulating material, and more particularly to an efficient, lightweight insulating material suitable for use aboard space vehicles having cryogenic fluids stored in tanks in a space environment.

A maneuvering space vehicle, such as lunar or interplanetary probes, includes tanks storing propellant and oxidizer. A cryogenic high energy fuel, such as liquid hydrogen, and an oxidizer such as liquid oxygen boil off in the vacuum of space as they are heated by radiation from the sun. Such boiling off must be kept to a minimum, since enough fuel must be provided to meet the energy requirements of the mission and enough additional fuel and oxidizer to compensate for losses. Since evaporization through boiling is the major source of loss, enough insulation must be provided on the tanks to reduce such loss to avoid having to place large additional amounts of fuel and oxidizer into space.

In the vacuum environment of space, absorbed radiation from the sun is the preponderant source of the heat energy furnished to boil the cryogenic liquids. Therefore, space vehicle cryogenic fluid tanks are provided with a radiation shield. An ideal radiation shield consists of several thin parallel layers of a highly reflective material with the layers separated by a vacuum to prevent conductive heat paths.

Heretofore known insulating materials employ sheets of aluminum foil supported by fiberglass mats, or plastic sheets coated with an aluminum film. Such materials are unsuitable for insulating the large cryogenic fluid tanks of space vehicles. As will be apparent, atmospheric gases, gases vented from the tanks, and effluent from the rocket motor are caught and trapped in the fiberglass sheets in the one case, and between the plastic sheets in the other, forming heat-conducting paths. The rate of gas diffusion is low, and complete diffusion into the vacuum of space takes an excessively long time. In addition, the mechanical problem of supporting these large sheets without forming heat-conducting bridges is difficult to solve.

The present invention comprises a plurality of thin plastic sheets discontinuously coated with aluminum foil and having one edge bonded to a base plastic sheet. The base sheet in turn is fastened to the outer wall of a cryogenic fluid tank. A fabric outer covering supports the plurality of plastic sheets in proper relationship to insulate the tank.

It is, therefore, an object of this invention to provide an efficient thermal insulation for space vehicle cryogenic tanks.

Another object of this invention is to provide a light weight thermal insulation for use in a vacuum environment.

Another object of this invention is to provide an efficient light weight thermal insulation which is easy to install on a cryogenic tank.

Figure 2:
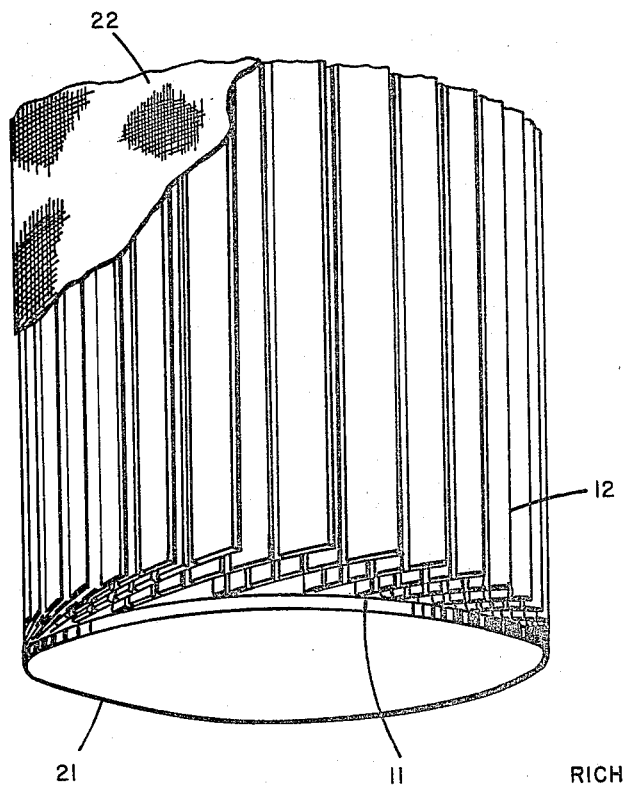

These and other objects and advantages of the present invention will become more apparent from the following specification and accompanying drawing, wherein:

FIGURE 1 is a cross-sectional view of the thermal insulation of the present invention, and FIGURE 2 illustrates the thermal insulation of the present invention installed on a cryogenic fluid tank of a space vehicle.

Referring to FIGURE 1, a base film 11 is adapted to be cemented to the outer wall of a cryogenic fluid tank. Attached to film 11 is one edge of a preferably rectangular plastic film 12. A plurality of reflecting metallic strips, such as 13, 14, 15 are firmly bonded to film 12 parallel to the edge of film 12 attached to base film 11. Gaps between the metallic strips are small, preferably less than one-tenth the width of the metallic strips. Additional metalllic strip carrying plastic films, such as 16 and 17, have their edges bonded to base film 11 adjacent one another.

As a result, a shingle-like assembly is provided, comprising base film 11 and a plurality of "shingle" films 12, 16 and 17. The gaps between the reflecting surfaces such as 13, 14 and 15 are staggered, so that a plurality of reflecting surfaces are always interposed between the cryogenic fluid tank and the radiation source.

Plastic films 11, 12, 16, 17, etc., are preferably fabricated of a thin, tough insulating material having flexibility at low temperatures and low permeability to gases. At present, the preferred material is the oriented polyester film prepared from the polymer formed by the condensation reaction between ethylene glycol and terephthalic acid commonly know as "Mylar." Reflecting surfaces such as 13, 14, 15 are preferably vapor deposited aluminum coatings applied to films 12, 16, 17, etc. while the films are suspended in a vacuum chamber and aluminum vapor is introduced into the chamber so as to deposit itself on the films.

Base film 11 of the prepared shingle assembly is bonded or otherwise fastened to the wall of a cryogenic fluid tank 21, as illustrated in FIGURE 2. The "shingle" sheets, as 12, 16, and 17, are held in position by an open weave fabric material 22.

While the embodiment of this invention herein disclosed is presently preferred, it is to be understood that other embodiments may occur to those skilled in the art, and the scope of the invention is to be limited only by the following claims.

I claim:

1. A space vehicle cryogenic fluid tank insulation comprising a plurality of non-heat-conducting films, each having one edge fastened to a base adjacent one another and overlapping in a shingle-like relationship, a subdivided heat reflector on a surface of said non-heat-conducting films, and means for supporting said films in shingle-like relationship on the outside surface of a cryogenic fluid tank.

2. A space vehicle cryogenic fluid tank insulation comprising a plurality of non-heat-conducting films having an outer surface and an inner surface, each having one edge on said inner surface fastened to a base adjacent one another and overlapping in shingle-like relationship, a subdivided heat reflector on said outer surface of said non-heat-conducting films, and means for supporting said films in a shingle-like relationship on the outside surface of a cryogenic fluid tank.

3. A space vehicle cryogenic fluid tank insulation comprising a plurality of non-heat-conducting films having an outer surface and an inner surface, each having one edge on the inner surface fastened to a base adjacent one another and overlapping in a shingle-like relationship, a subdivided metal heat reflector on the outer surface of said non-heat-conducting films, and means for supporting said films in shingle-like relationship on the outside surface of a cryogenic fluid tank.

4. A space vehicle cryogenic fluid tank insulation comprising an inner plastic film adjacent the outer wall of said cryogenic fluid tank, an outer fabric layer pervious to gases, and heat reflecting means between said inner plastic layer and said outer fabric layer, said heat reflecting means including a multiplicity of independent plastic films each having one edge fastened to said inner plastic film in overlapping relationship to adjacent independent plastic films, each of said independent plastic films having a discontinuous aluminum heat reflecting surface.

5. A space vehicle cryogenic fluid tank insulation comprising an inner plastic film adjacent the outer wall of said cryogenic fluid tank, an outer fabric layer pervious to gases, and heat reflecting means between said inner plastic layer and said outer fabric layer, said heat reflecting means including a multiplicity of independent plastic films each having one edge fastened to said inner plastic film in overlapping relationship to adjacent independent plastic films, each of said independent plastic films having a discontinuous heat reflecting surface subdivided parallel to the edge fastened to said inner plastic film.

6. A space vehicle cryogenic fluid tank insulation comprising an inner plastic film adjacent the outer wall of said cryogenic fluid tank, an outer fabric layer pervious to gases, and heat reflecting means between said inner plastic layer and said outer fabric layer, said heat reflecting means including a multiplicity of independent rectangular plastic films each having one edge fastened to said inner plastic film parallel to the longitudinal axis of said cryogenic fluid tank in overlapping relationship to adjacent independent plastic films, each of said independent plastic films having a discontinuous aluminum heat reflecting surface subdivided parallel to the longitudinal axis of said cryogenic fluid tank.

References Cited by the Examiner
UNITED STATES PATENTS

| 2,675,807 | 4/1954 | Pursel | 154—44 X |
| 2,696,006 | 12/1954 | Tuck. | |
| 2,889,078 | 6/1959 | Thomas. | |

LOUIS G. MANCENE, *Primary Examiner.*

MORRIS SUSSMAN, JAMES R. GARRETT, THERON E. CONDON, *Examiners.*